(12) United States Patent
Bonetto et al.

(10) Patent No.: US 11,885,167 B2
(45) Date of Patent: Jan. 30, 2024

(54) EMERGENCY ACTUATING DEVICE (71) Applicants: Claudia Bonetto, Giaveno (IT); Claudio Bonetto, Trana (IT); Paola Bonetto, Trana (IT); Oriana Pampolini, Trana (IT)

(72) Inventors: Claudia Bonetto, Giaveno (IT); Claudio Bonetto, Trana (IT); Paola Bonetto, Trana (IT); Oriana Pampolini, Trana (IT)

( * ) Notice: Subject to any disclaimer, the term of this patent is extended or adjusted under 35 U.S.C. 154(b) by 506 days.

(21) Appl. No.: 16/976,811

(22) PCT Filed: Apr. 29, 2019

(86) PCT No.: PCT/IB2019/053490
§ 371 (c)(1),
(2) Date: Aug. 31, 2020

(87) PCT Pub. No.: WO2019/175858
PCT Pub. Date: Sep. 19, 2019

(65) Prior Publication Data
US 2020/0399947 A1 Dec. 24, 2020

(51) Int. Cl.
*E05F 15/00* (2015.01)
*E05F 15/40* (2015.01)
(Continued)

(52) U.S. Cl.
CPC .............. *E05F 15/40* (2015.01); *B60J 5/062* (2013.01); *E05B 1/0061* (2013.01); *E05B 77/54* (2013.01);
(Continued)

(58) Field of Classification Search
CPC ....... E05F 15/00; E05F 15/611; E05F 15/665; E05F 15/657; E05F 15/40; E05F 15/42;
(Continued)

(56) References Cited

U.S. PATENT DOCUMENTS 5,772,238 A   6/1998  Breed et al.
8,008,910 B2  8/2011  Booth et al.
(Continued)

FOREIGN PATENT DOCUMENTS

EP   0759496 A1   2/1997
EP   2213823 A2   8/2010

*Primary Examiner* — Chi Q Nguyen
(74) *Attorney, Agent, or Firm* — Howson & Howson LLP (57) ABSTRACT

Emergency actuating device, especially for vehicle doors, is provided. The device includes: a support base; a manual actuation element adapted to assume rest and actuation configurations; an electromagnetically driven locking mechanism adapted to lock the actuation element in its rest configuration; a protective shell adapted to assume a closed configuration in which the shell isolates the actuation element from the outer environment when the actuation element is in its rest configuration, and makes it impossible to reach the actuation element with a hand, and an open configuration, in which the actuation element can be reached with a hand to be brought from the rest configuration to the actuation configuration and vice versa; and an opening sensor adapted to generate an electric signal indicative of the open configuration of the protective shell, the signal being processable by an electronic control unit for controlling locking and/or unlocking of the locking mechanism.

17 Claims, 6 Drawing Sheets

(51) Int. Cl.
*B60J 5/06* (2006.01)
*E05B 1/00* (2006.01)
*E05B 77/54* (2014.01)
*E05B 81/08* (2014.01)
*E05F 11/54* (2006.01)

(52) U.S. Cl.
CPC .............. *E05B 81/08* (2013.01); *E05F 11/54* (2013.01); *E05Y 2900/506* (2013.01); *E05Y 2900/531* (2013.01)

(58) Field of Classification Search
CPC ........ E05F 11/54; E05B 1/0061; E05B 77/54; E05B 81/08; E05Y 2900/506; E05Y 2900/531; E05Y 2201/214; E05Y 2201/68; E05Y 2800/252; E05Y 2900/51; B60J 5/062
See application file for complete search history.

(56) References Cited

U.S. PATENT DOCUMENTS

| | | |
|---|---|---|
| 8,843,278 B2 | 9/2014 | Koberstaedt et al. |
| 9,174,517 B2 | 11/2015 | Scheuring et al. |
| 9,322,204 B2 | 4/2016 | Suzuki |
| 10,087,671 B2 | 10/2018 | Linden et al. |
| 11,525,290 B2* | 12/2022 | Nam ...................... E05B 81/16 |
| 2004/0154225 A1 | 8/2004 | Sanke et al. |
| 2011/0148575 A1* | 6/2011 | Sobecki ................ E05B 85/107 |
| | | 292/336.3 |
| 2017/0167169 A1* | 6/2017 | Sobecki ................. E05B 5/006 |
| 2019/0119958 A1* | 4/2019 | Gerber .................... E05B 85/16 |
| 2020/0102773 A1* | 4/2020 | Sobecki ................ E05B 85/103 |
| 2020/0199916 A1* | 6/2020 | Cumbo .................. E05B 81/25 |
| 2020/0362602 A1* | 11/2020 | Sobecki ................ E05B 81/34 |
| 2021/0230900 A1* | 7/2021 | Swartz ................ E05B 47/0038 |
| 2022/0010607 A1* | 1/2022 | McGreevy ............ E05F 15/643 |
| 2022/0349223 A1* | 11/2022 | Roeder .................. E05B 83/40 |

* cited by examiner

EMERGENCY ACTUATING DEVICE

TECHNICAL FIELD

The present invention relates to an emergency actuating device. More specifically, the invention relates to an emergency remote actuating device for sliding doors and, even more specifically, for doors of passenger transportation vehicles such as buses, minibuses and the like.

PRIOR ART

Vehicles intended for transporting passengers can be equipped with motorized doors actuated by an actuator, for example an electric, pneumatic or hydraulic actuator. For safety reasons, during normal use or parking of the vehicle, motorized doors cannot usually be actuated, i.e. opened or closed, manually. Manual opening of the doors is usually allowed only by disengaging, by means of an appropriate emergency actuation device, the motorized system that causes opening and closing of the doors.

For safety reasons, the access doors of vehicles, especially of passenger transportation vehicles, need to be provided with an actuating device that allows to open the doors and/or actuate other devices, such as, for example, electrically controlled platforms for disabled people, electric step boards, electric hand brakes, in case of emergency or failure of the motorized system. In some arrangements, the motorized system comprises an electric actuator or gear motor, fixedly mounted on a first plate, said plate being capable of oscillating relative to a second, fixed plate. The two plates are hinged to each other and can be actuated by acting onto a Bowden tie rod or cable, connected to an emergency handle hinged to the vehicle chassis. When the handle is in a rest condition, the two plates are configured so that a pinion mounted on the primary or drive shaft of the electric gear motor is engaged with a toothed wheel mounted on a driven shaft rotatably associated with the second plate. In this engagement configuration, it is usually impossible to actuate the door manually, because of the kinematic chain that is established between the door and the gear motor which usually provides for a worm screw transmission. When the handle is brought to an emergency opening position, the two plates are moved relative to each other for disengaging the pinion of the primary shaft from the toothed wheel. In this configuration, the door can be actuated manually, in particular opened, for example in a situation of emergency or failure of the motorized system.

A known example of an actuating device of the aforementioned type is disclosed in EP 2 213 823(A1).

Still for safety reasons, it is further provided that the door(s) of the vehicle cannot be opened when the vehicle is travelling, for example when the speed exceeds a certain predetermined threshold. Such threshold can vary depending on the jurisdictions, but it usually corresponds to about 3 km/h.

Consequently, vehicles that need to be equipped with a control device allowing to manually open the doors in case of emergency or failure are also preferably provided, depending on the regulations, with a mechanism for locking or inhibiting said device, which mechanism intervenes when the travelling speed of the vehicle exceeds a predetermined threshold.

One of the problems encountered in designing an emergency actuating device is how to make functioning of the device reliable in any conditions of use. In particular, the control device must allow to open the doors with no risks of jamming and even after a long period of use of the vehicle.

A first object of the invention is therefore to provide an emergency actuating device for doors of vehicles such as buses, minibuses and the like, which is reliable over time.

As anticipated above, the known devices usually provide for a mechanical locking of the device, when the vehicle speed exceeds a certain threshold. Such mechanical locking is usually actuated by an actuator, which has to be continuously powered during travel of the vehicle, in order to keep the device in a locked configuration. In this way, it is possible to prevent the doors from being accidentally opened in case a passenger should operate the emergency handle while the vehicle is travelling.

A problem related to this kind of solutions arises from the electric power consumption due to the need to maintain the actuator continuously powered during travel of the vehicle. In addition, because of the repeated intervention of the actuator, whenever the vehicle moves from a parking condition to a travel condition and vice versa, wear and stress of the actuator can occur.

Another object of the invention is therefore to solve this second problem by providing an emergency actuating device for doors of vehicles such as, for example, buses, minibuses and the like, which does not have the described drawbacks.

A not least object of the invention is to provide a device of the aforementioned type that can be manufactured at convenient costs and is therefore suitable for a large-scale industrial production.

These and other objects are achieved by the emergency actuating device, in particular the emergency remote actuating device, for doors of vehicles such as, for example, buses and minibuses and the like, as claimed in the appended claims.

DISCLOSURE OF THE INVENTION

The emergency actuating device according to the invention mainly comprises a support base with which an actuation element is associated. The actuation element can be of various kinds, but it preferably includes a lever, a handle, a rotatable knob, a slider or a wheel. The actuation element can be made of any suitable material, for example plastics, and shall preferably be red in color, in order to be easily recognizable to the occupants of the vehicle.

The support base preferably consists of a corresponding plate that can be advantageously shaped in an appropriate manner and is made of plastics or metal material. The actuation element is hinged or articulated to the support base, or it can slide relative thereto, and is capable of assuming a first configuration and a second configuration, of rest and actuation, respectively. More generally, the support base and the actuation element are capable of moving relative to each other so that the actuation element can assume said two configurations.

In a preferred embodiment of the invention, the actuation element comprises a first anchoring element adapted to accommodate a first end of a flexible actuating cable. A second anchoring element is provided in the support base and is adapted to accommodate a first end of rigid or flexible sheath in which the flexible cable runs. The opposite ends of the flexible cable and of the sheath are associated with corresponding anchoring elements provided in a first and second component, respectively, for example a pair of plates, movable relative to each other, the mutual position of which determines, according to prior art, the engagement or disengagement of the motorized system for moving a vehicle door. Still according to the invention, the cable and the corresponding sheath, for example of the Bowden type, can be replaced by other members transmitting the movement of the actuation element relative to the support base. For example, said transmitting members may include levers, rods, toothed wheels, cables of various kinds, a hydraulic or pneumatic circuit, or a combination thereof. In addition, still according to the invention, the actuation element can cause opening and closing of the doors through an electric controller. In this case, the actuation element can be provided with a sensor adapted to generate a signal indicating that the actuation element has reached the actuation configuration. The sensor shall advantageously be associated with an electric circuit, either wired or wireless, for conveying said signal to an actuator, for example an electrically driven actuator, which causes disengagement of said motorized system.

According to the invention, the actuating device is also advantageously provided with an electromagnetically driven locking mechanism adapted to lock the actuation element in its rest configuration, thus preventing said actuation element from assuming the actuation configuration, for example when such configuration might be dangerous because of the traveling speed of the vehicle.

A protective shell, or lid or grid or other suitable element is associated, for example hinged, or removably snapped on, to the support base and is adapted to assume, relative to the support base, a first and a second configuration, i.e. respectively a rest or closed configuration, in which the actuation element is isolated from the outer environment, or anyway cannot be reached by a human hand, and an actuation or open configuration, in which the actuation element can be reached by a hand for being brought from the rest configuration to the actuation configuration and vice versa.

The shell is also preferably made transparent, for making the handle visible from the outside when the shell is closed.

According to the invention, advantageously, the device is further provided with an opening sensor adapted to generate an electric signal indicative of the configuration of the protective shell, lid or other suitable element. Said electric signal is processable by an electronic control unit for controlling locking and/or unlocking of the electromagnetic locking mechanism of the actuation element.

Preferably, according to the invention, the electromagnetic actuator is provided with a coil which can be fed by a triggering current in order to shift the actuator from its rest condition to its excited condition in which the actuation element is locked, and by a second, holding current once the actuation element is locked.

In a preferred embodiment of the invention, the electromagnetically driven actuator is provided rearwardly in the support base, on the opposite side relative to the actuation element. In this arrangement the support base comprises an opening for passage of an engagement anchor solidly connected to the actuation element. The engagement anchor is adapted to engage into a ratchet provided on the movable part of the electromagnetically driven actuator. Other solutions and arrangements, for example ratchet and pawl mechanisms, hooks or the like are, however, possible in order to lock the movement of the actuation element relative to the support base.

In a preferred embodiment of the invention, the opening sensor and the electromagnetically driven locking mechanism are electrically connected to an electronic control unit. Said control unit is programmed for bringing the locking mechanism to a configuration in which it locks the actuation element, when the control unit receives a signal indicating that the speed of the vehicle exceeds a predetermined threshold. Said signal can come, for example, from a tachograph unit mounted on the vehicle equipped with the actuating device according to the invention.

In addition, in a preferred embodiment of the invention, the control unit is programmed to bring the locking mechanism to a configuration in which it locks the actuation element, when a condition arises in which the signal generated by the opening sensor is indicative of the open configuration of the protective shell.

The actuating device further comprises, preferably, an optical and/or audible warning device which is triggered when the signal generated by the opening sensor of the actuation device is indicative of the open configuration of the protective shell.

The operation of the actuating device according to the invention, when installed on a vehicle provided with motorized doors, preferably provides for two main operational conditions. A first condition occurs when the control panel of the vehicle is electrically energized (usually when the ignition key is inserted and rotated to the position for energizing the panel, or for starting the engine of the vehicle) and the vehicle is stationary or moving at a speed lower than a predetermined threshold, typically 3 km/h. When this condition occurs, if the protective shell of the actuating device is opened, the signal generated by the opening sensor causes triggering of a corresponding audible and/or visual alarm signal. This alarm signal is mainly aimed at signaling the condition of tampering of the device to the vehicle driver.

After the protective shell has been opened, the actuation element is accessible and can be manipulated to bring it into the configuration for actuating the disengagement of the motorized system which actuates opening and closing of the vehicle doors. Bringing the actuation element to said actuation configuration causes the disengagement of the motorized system, for example by tensioning the cable housed in the Bowden sheath, thus making it possible, in an emergency, to manually open the door, or doors, associated with the motorized system.

A second operational condition of the device according to the invention occurs when the vehicle is moving at a speed higher than a predetermined threshold, typically about 3 km/h. In this condition, if the shell is opened, the signal generated by the opening sensor causes triggering of a corresponding audible and/or visual alarm signal. In addition, the handle is blocked by the electromagnetic locking mechanism, which is excited by a signal coming from said control unit.

Advantageously, the actuating device according to the invention allows locking of the actuation element only when the vehicle speed exceeds a certain threshold. In addition, advantageously, the invention allows to warn the driver with an alarm signal, before the actuation element, or emergency handle, is operated. This condition is particularly effective in vehicles that can accommodate numerous passengers, since it allows the driver to be warned of the attempted tampering, even when said attempt has not been able to cause the doors to be disengaged due to the vehicle traveling speed.

BRIEF DESCRIPTION OF THE FIGURES

Some preferred embodiments of the invention will be described by way of non-limiting example with reference to the annexed figures, in which.

DESCRIPTION OF A PREFERRED EMBODIMENT

In the annexed Figures, an emergency remote actuating device, particularly for vehicle doors and even more particularly for doors of passenger transportation vehicles such as buses has been indicated as a whole with reference numeral 11.

The device 11 comprises a support base 13 which, in the illustrated embodiment, is a corresponding elongated plate made, for example, of plastics or metal and provided with means 13a for fixing the plate to a vehicle chassis or body. In the illustrated embodiment, said means comprise a pair of corresponding holes for the passage of screws or rivets, and the base 13 can be made of a metal or plastic material. In other embodiments, said means may include at least one metal portion of said base 13 adapted to be welded to said chassis or body.

An actuation element 15 formed, in the shown example, by a corresponding actuating handle, is associated with the support base 13. Still referring to the shown example, the actuation element 15 is hinged to the support base 13 and is adapted to assume, by rotating relative to the support base, a first and a second configuration, respectively of rest and actuation. In the rest configuration (FIG. 3) the actuation element 15 or actuating handle, is in a proximal position, substantially in contact with the support base or metal plate 13, whereas in the actuation configuration (FIG. 2) the actuation element 15 is rotated in a distal position relative to said plate 13.

In the illustrated embodiment, the actuation element 15 comprises a first anchoring element 17 adapted to accommodate a first end 19 of a flexible actuating cable 21.

A second anchoring element 23 is provided in said support base 13 and is adapted to accommodate a first end 25 of rigid or flexible sheath 27 in which the flexible cable 21 runs.

The opposite ends of the flexible cable 21 and of the sheath 27 are not shown and they are associated, according to prior art, with corresponding anchoring elements provided in a first and second component, respectively, movable relative to each other, the mutual position of which determines the engagement or disengagement of the motorized system for moving a vehicle door.

The device 11 is further provided with an electromagnetically driven locking mechanism 29 adapted to lock the actuation element 15 in its rest configuration, thus preventing said actuation element 15 from assuming the actuation configuration.

Figure 1:
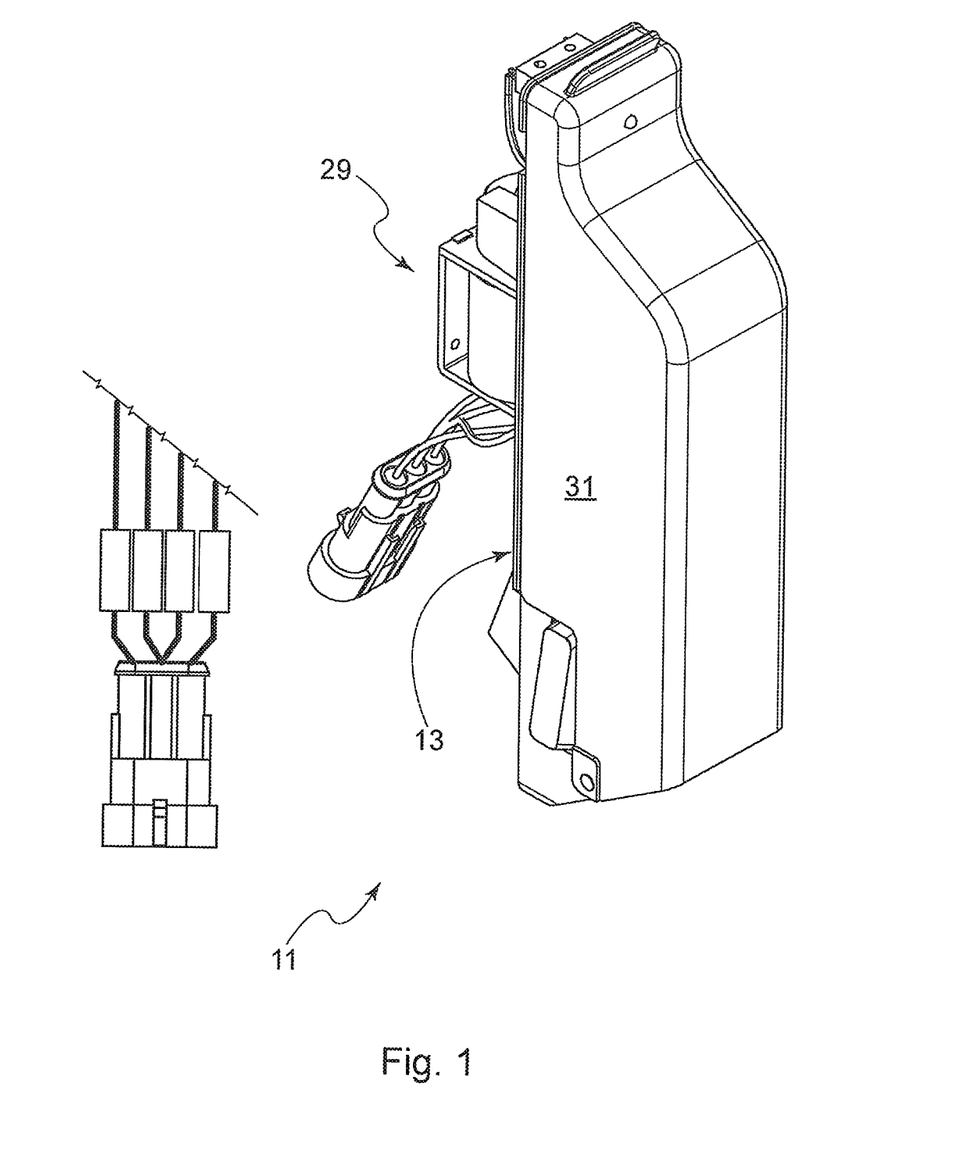
FIG. 1 is an axonometric view of the device in its closed configuration, in a preferred embodiment of the invention.
Figure 2:
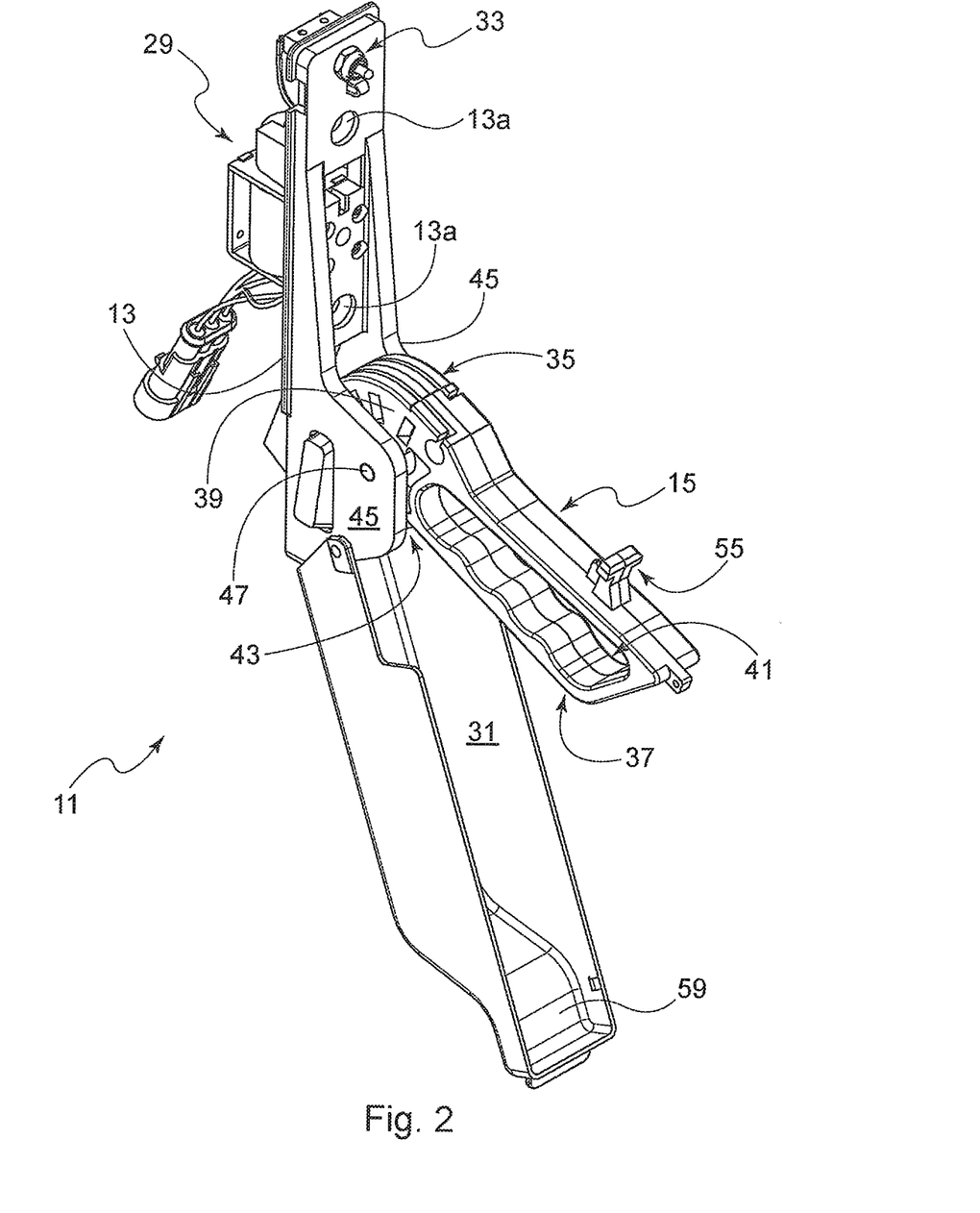
FIG. 2 is an axonometric view of the device of FIG. 1 when open.
Figure 3:
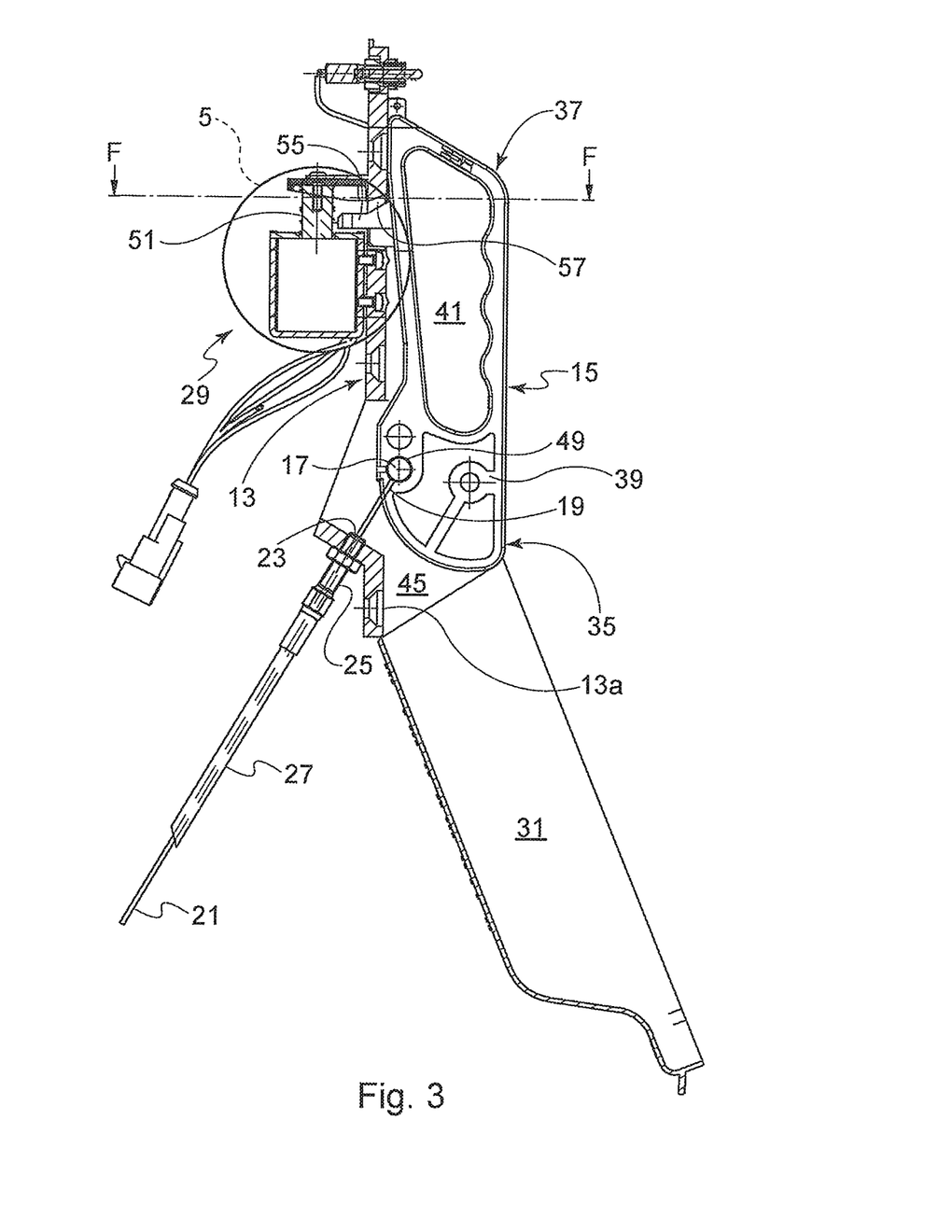
FIG. 3 is a sectional side view of the device of FIG. 1 with its shell open and the handle in its rest condition.
Figure 4:
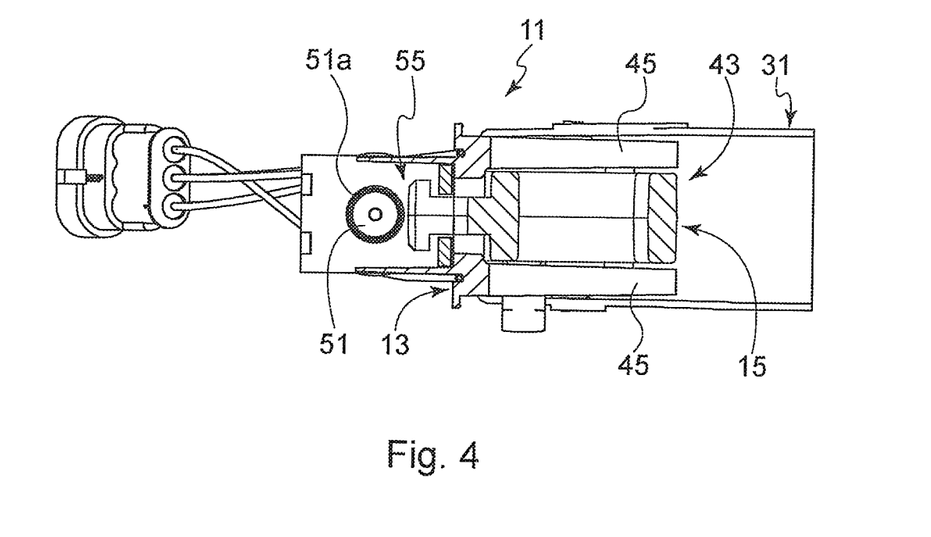
FIG. 4 is a section taken along the plane F-F of FIG. 3.
Figure 5:
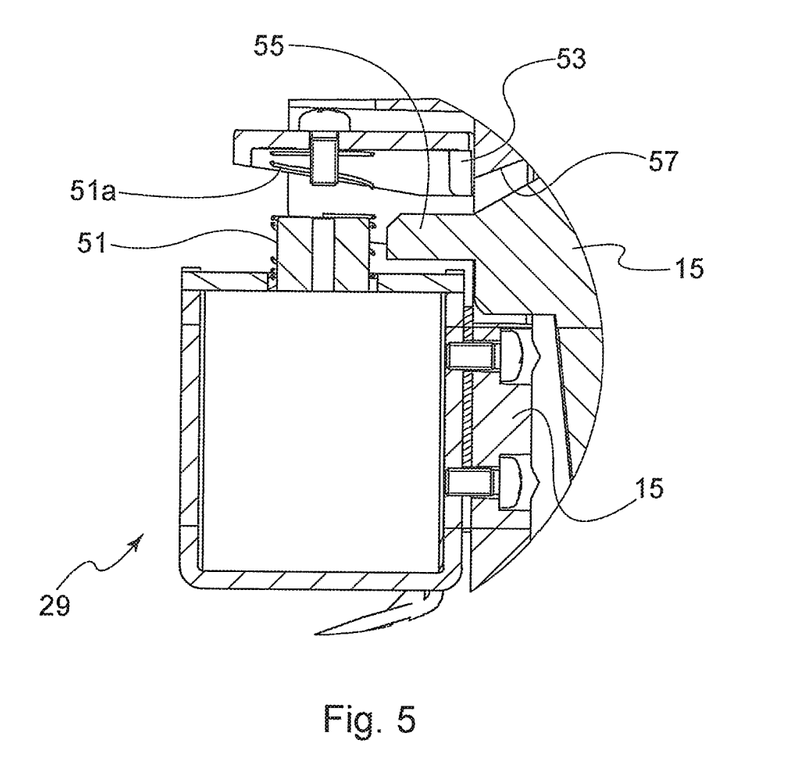
FIG. 5 is an enlarged view of a detail of FIG. 3.

A protective shell 31 is associated with the support base 15 and is adapted to assume, relative to the support base 13, a first and a second configuration, i.e. respectively a rest or closed configuration in which said shell 31 isolates at least partially the actuation element 15 from the outer environment and prevents the actuation element 15 from being reached by a hand, and an operational or open configuration, illustrated in FIGS. 2 and 3, in which the actuation element 15 can be reached with a hand in order to be brought from the rest configuration to the actuation configuration and vice versa.

In the illustrated embodiment, the shell 31 can be closed against the support base 13 only when the actuation element or handle 15 is also against the base 13, in the rest configuration.

The device 11 is further provided with an opening sensor 33, adapted to generate an electric signal indicative of the configuration of the protective shell 31. Said electric signal is processable by an electronic control unit for controlling locking and/or unlocking of the electromagnetic locking mechanism 29 of the actuation element 15.

In the illustrated embodiment, the actuation element 15 includes a handle, preferably made of plastic material and preferably being red in color, in order to be easily recognizable to the occupants of the vehicle.

The handle 15 is provided with a first portion 35, or hinging portion, and a second portion 37, or grab portion. The hinging portion 35 advantageously defines a first hinge part 39 for hinging the handle 15 to the plate 13. In addition, the grab portion 37 preferably comprises a slit 41 adapted for the passage of the fingers of a hand and anatomically shaped for being safely grasped and manipulated by a human being.

The plate 13 comprises a second hinge part 43 defined between a pair of wings 45 extending parallel to each other and perpendicular to the support base or plate 13. The actuation element 15 is hinged to the support base or plate 13 by means of said hinge parts 39,43 and a corresponding hinge pin 47 associated thereto. In the illustrated embodiment, in particular, the first hinge part 39 is received between the wings 45 defining the second hinge part 43 and the hinge pin 47 passes throughout both wings 45 and the first hinge part 39. In this embodiment, the handle 15 can rotate by approximately 180° about the hinge axis of the pin 47.

As can be better seen from FIG. 3, the flexible cable 21 and the sheath 27 define a so-called Bowden cable and the first anchoring element 17 comprises a corresponding, radially bored pin rotatably associated with the actuation element 15 at a transverse seat 49 provided in the hinging portion 35. The radial bore of the pin 17 is adapted to receive the end of the cable 21. The second anchoring element 23 comprises a corresponding threaded bore intended for the passage of the cable 21 and adapted to receive the threaded end of the protective sheath 27. In the illustrated embodiment, when the actuation element 15 is moved from the rest configuration to the actuation configuration and vice versa, the cable is slidably guided within the protective sheath 27, the pin 17 and the threaded bore 23 being moved closer to or away from each other, respectively. According to the invention, the electromagnetically driven locking mechanism 29 comprises a corresponding electromagnetic actuator provided with a sliding rod 51 having an anchoring head 53 adapted to cooperate, in order to keep the actuation element 15 in its rest configuration, with an anchor 55 projecting from the actuation element 15 and extending in the grab portion 37, behind the base of the anatomically shaped slit 41. Preferably, according to the invention, the electromagnetic actuator 29 comprises a coil which can be fed by a triggering current for quickly shifting the actuator 29 from its rest condition to its excited condition in which the anchor 55 is engaged and by a holding current feeding the coil once the anchor 55 is engaged. A helical spring 51a is also fitted on the rod 51, for bringing back the rod 51 to its rest configuration (upwards in FIG. 3), i.e. to its unlocked configuration, when the coil is not excited.

The actuator 29 is provided rearwardly in the support base on the opposite side relative to the actuation element 15 and the support base 13 comprises an opening 57 for the passage of the anchor 55 when the actuation element 15 is in its rest configuration. The protective shell 31 is made of a transparent plastic material and, in the illustrated embodiment, is hinged to the support base 13 at the wings 45 defining the second hinge part 43 for the actuation element 15. The protective shell 31 comprises a signaling portion 59 interfering with the opening sensor 33 for signaling the position of the shell 31 relative to the support base 13 by means of the electric signal generated by the sensor 33. The opening sensor 33 comprises a corresponding microswitch fixed to the support base 13 at a support base surface adjacent to the signaling portion 59 of the shell 31, when the shell 31 is in its rest configuration.

Figure 6:
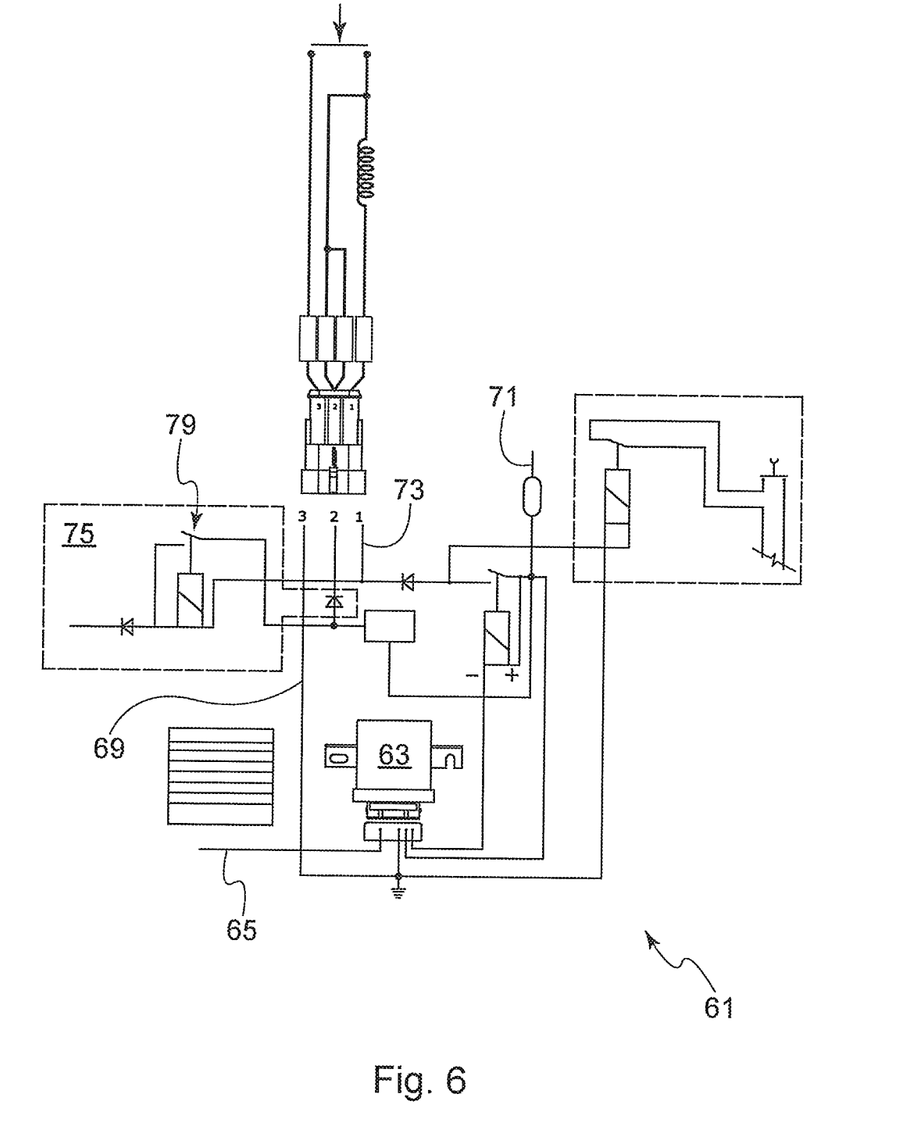
FIG. 6 is an electrical diagram of a circuit connected to the device of FIG. 1.

Referring to FIG. 6, in a preferred embodiment of the invention, the opening sensor 33 and the electromagnetically driven locking mechanism 29 are electrically connected, in an electric circuit 61, to an electronic control unit 63. The control unit 63 is programmed to bring the locking mechanism to a configuration in which it locks the actuation element 15, when the control unit receives a signal indicating that the vehicle speed exceeds a predetermined threshold. Said signal can come, for example, from a tachograph unit mounted on the vehicle equipped with the actuating device according to the invention and connected to the control unit 63 by a conductor 65.

Furthermore, in a preferred embodiment of the invention, the control unit 63 is programmed to bring the locking mechanism to a configuration in which it locks the actuation element 15 when a further condition occurs according to which the signal generated by the opening sensor 33 is indicative of the open configuration of the protective shell 31. This signal is supplied to the control unit 63 through the conductor 67.

The device according to the invention preferably further comprises an optical and/or audible warning device 69 which is triggered by the signal generated by the opening sensor 33 and indicative of the open configuration of the protective shell 31.

The operation of an actuating device according to the invention, when installed on a vehicle equipped with motorized doors, will be briefly described hereafter. The device provides for two main operational conditions. A first condition occurs when the control panel of the vehicle is electrically energized (usually when the ignition key is inserted and rotated to the position for energizing the panel, or for starting the engine of the vehicle) and the vehicle is stationary. In the circuit 61, the conductor supplying the circuit when the control panel is energized is indicated by reference numeral 71. When this condition occurs, if the protective shell 31 is opened, the signal generated by the opening sensor 33 causes triggering of a corresponding audible and/or visual alarm signal through the warning device 69. The handle 15 can therefore be manipulated in order to bring it to the actuation configuration for disengaging the motorized system that actuates opening and closing of the vehicle doors. By bringing the handle 15 to said actuation configuration, the cable 21 is tensioned by the Bowden sheath and causes disengagement of the motorized system, thus making it possible to open, in an emergency, the door(s) of the vehicle on which the device 11 is installed.

A second operational condition of the device 11 occurs when the vehicle is traveling at a speed exceeding a predetermined threshold, typically about 3 km/h. In this condition, when the shell 31 is opened, the signal generated by the opening sensor 33 causes triggering of a corresponding audible and/or visual alarm signal through the warning device 69. Furthermore, the handle 15 is locked by the electromagnetic locking mechanism 29, which is excited by a signal coming from said control unit through the conductor 73.

In an embodiment variant of the electric circuit 61, there is also provided a circuit portion 75 in which the control unit 63 is connected to a relay 79 which closes the circuit supplying the warning device 69 when the vehicle door is open. In this way, the control unit 63 can emit an alarm signal by means of the warning device 69, in the case in which the vehicle starts traveling with the door open.

Numerous variants and modifications, all falling within the same inventive concept, can be made to the emergency actuating device as described and illustrated.

The invention claimed is:

1. An emergency actuating device, comprising:
a support base;
a manual actuation element associated with the support base and adapted to assume, relative to the support base, a rest configuration and an actuation configuration;
an electromagnetically driven locking mechanism adapted to lock the actuation element in the rest configuration, thus preventing said actuation element from assuming the actuation configuration;
a protective shell associated with the support base and adapted to assume, relative to the support base, a first configuration and a second configuration, wherein the first configuration of the protective shell is a closed configuration and in said first configuration said shell isolates or partially isolates the actuation element from an outer environment, the actuation element being in the rest configuration, so as to make reaching the actuation element with a hand impossible, and wherein the second configuration of the protective shell is an open configuration and in said second configuration the actuation element can be reached with the hand in order to be brought from the rest configuration to the actuation configuration and from the actuation configuration to the rest configuration;
an opening sensor adapted to generate an electric signal indicative of the open configuration of the protective shell, said signal being processable by an electronic control unit for controlling locking and unlocking of the locking mechanism.

2. The device according to claim 1, wherein said support base comprises a support plate provided with means for fixing the plate to a vehicle chassis or body, said means comprising holes for screws or rivets, or at least one metal portion adapted to be welded to said chassis or body.

3. The device according to claim 2, wherein the locking mechanism comprises an electromagnetically driven actuator provided with a coil, wherein said coil is configured to be fed a triggering current to shift the actuator from a rest condition to an excited condition, wherein in said exited condition the actuation element is locked, and a holding current once the actuation element is locked.

4. The device according to claim 1, wherein said actuation element comprises a handle provided with a first portion, or hinging portion, and a second portion, or grab portion, said hinging portion comprising a first hinge part and said grab portion comprising a slit adapted to receive the fingers of the hand.

5. The device according to claim 4, wherein said support base comprises a second hinge part defined between a pair of wings extending parallel to each other and perpendicular to the support base, and wherein the actuation element is hinged to the support base by means of said hinge parts and a corresponding hinge pin associated thereto, said first hinge part being received between the wings defining the second hinge part, and the hinge pin passing throughout both hinge parts.

6. The device according to claim 5, wherein the electromagnetically driven locking mechanism comprises an electromagnetic actuator provided with a sliding rod having an anchoring head adapted to cooperate, in order to keep the actuation element in the rest configuration, with an anchor projecting from the actuation element and extending in the grab portion, behind the base of the slit, the electromagnetic actuator being provided rearwardly in the support base on the opposite side relative to the actuation element, and the support base comprising an opening for passage of the anchor of the actuation element placed in the rest configuration.

7. The device according to claim 5, wherein the protective shell is made of a transparent or opaque plastic material and is removable from or hinged to the support base at the wings defining the second hinge part for the actuation element, the protective shell comprising a signaling portion interfering with the opening sensor for signaling the position of the shell relative to the support base.

8. The device according to claim 7, wherein the opening sensor comprises a microswitch fixed to the support base at a support base surface adjacent to the signaling portion of the shell in the rest configuration.

9. The device according to claim 8, wherein the locking mechanism comprises an electromagnetically driven actuator provided with a coil, wherein said coil is configured to be fed a triggering current to shift the actuator from a rest condition to an excited condition, wherein in said exited condition the actuation element is locked, and a holding current once the actuation element is locked.

10. The device according to claim 7, wherein the locking mechanism comprises an electromagnetically driven actuator provided with a coil, wherein said coil is configured to be fed a triggering current to shift the actuator from a rest condition to an excited condition, wherein in said exited condition the actuation element is locked, and a holding current once the actuation element is locked.

11. The device according to claim 5, wherein the locking mechanism comprises an electromagnetically driven actuator provided with a coil, wherein said coil is configured to be fed a triggering current to shift the actuator from a rest condition to an excited condition, wherein in said exited condition the actuation element is locked, and a holding current once the actuation element is locked.

12. The device according to claim 4, wherein the locking mechanism comprises an electromagnetically driven actuator provided with a coil, wherein said coil is configured to be fed a triggering current to shift the actuator from a rest condition to an excited condition, wherein in said exited condition the actuation element is locked, and a holding current once the actuation element is locked.

13. The device according to claim 1, wherein the opening sensor and the locking mechanism are electrically connected to the electronic control unit, said electronic control unit being programmed for making the locking mechanism lock the actuation element in response to receiving a signal or signals indicative of a vehicle speed higher than a predetermined threshold and indicative of the protective shell being in the open configuration by the opening sensor.

14. The device according to claim 13, wherein the signal generated by the opening sensor and indicative of the open configuration of the protective shell triggers a visual or audible warning device.

15. The device according to claim 14, wherein the locking mechanism comprises an electromagnetically driven actuator provided with a coil, wherein said coil is configured to be fed a triggering current to shift the actuator from a rest condition to an excited condition, wherein in said exited condition the actuation element is locked, and a holding current once the actuation element is locked.

16. The device according to claim 13, wherein the locking mechanism comprises an electromagnetically driven actuator provided with a coil, wherein said coil is configured to be fed a triggering current to shift the actuator from a rest condition to an excited condition, wherein in said exited condition the actuation element is locked, and a holding current once the actuation element is locked.

17. The device according to claim 1, wherein the locking mechanism comprises an electromagnetically driven actuator provided with a coil, wherein said coil is configured to be fed a triggering current to shift the actuator from a rest condition to an excited condition, wherein in said exited condition the actuation element is locked, and a holding current once the actuation element is locked.

\* \* \* \* \*